S. S. GREENFIELD.
FLUID TRANSMISSION MECHANISM.
APPLICATION FILED JULY 29, 1918.
1,297,347.
Patented Mar. 18, 1919.
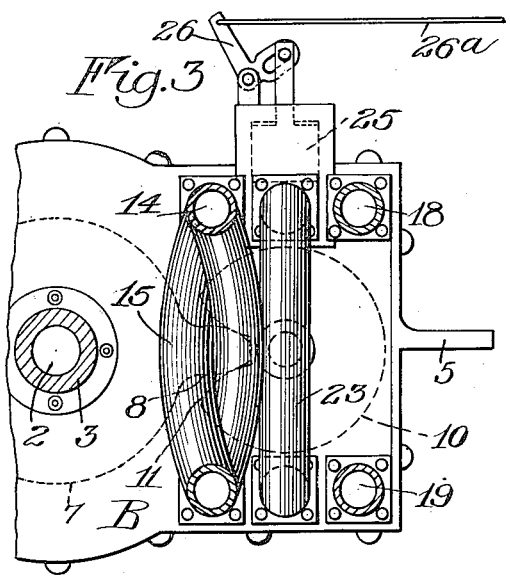
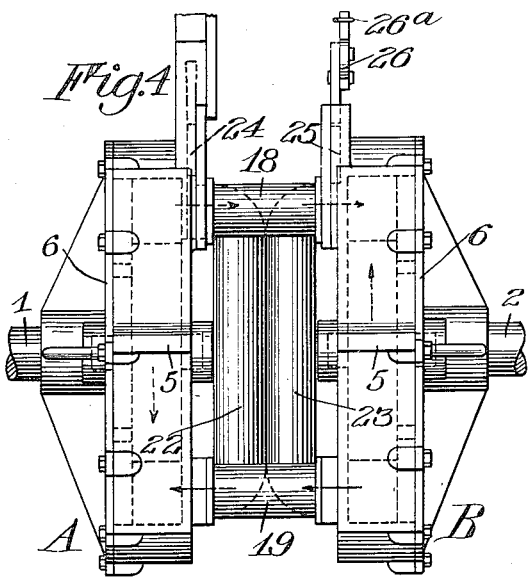
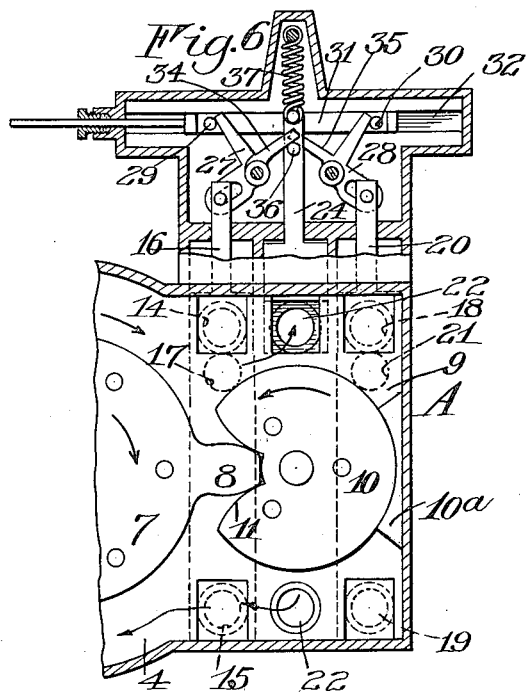
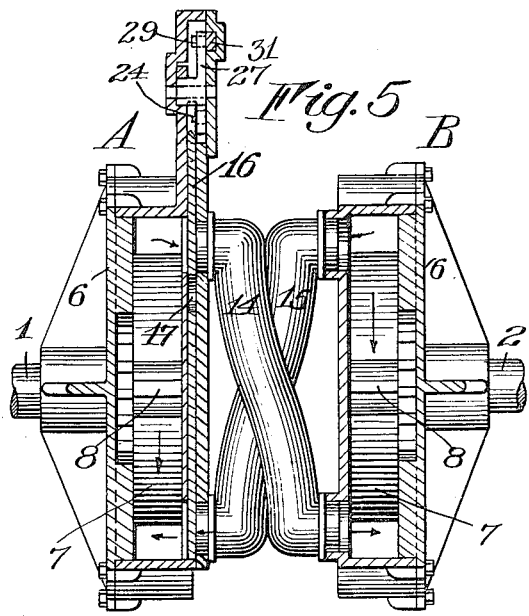
Inventor
Samuel S. Greenfield
by Davis & Simms
his Attorney

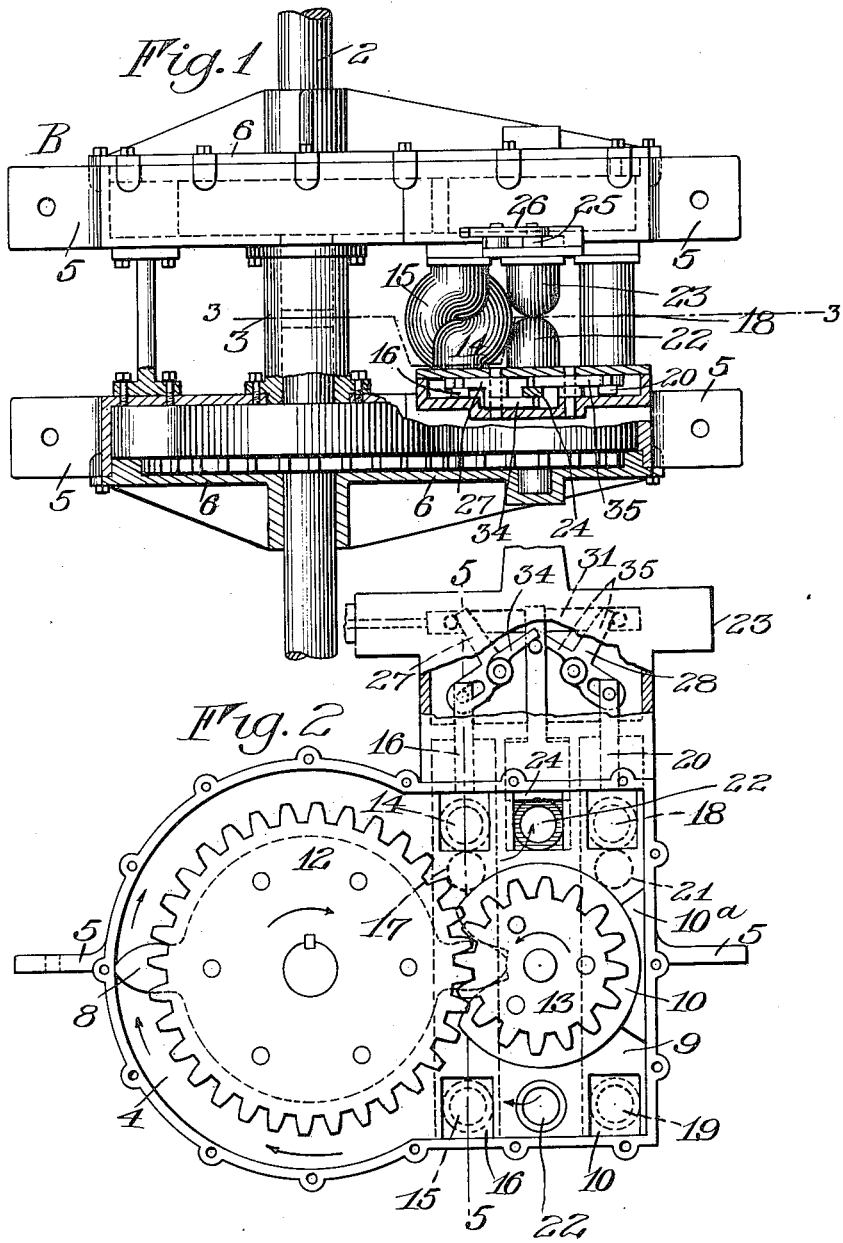

UNITED STATES PATENT OFFICE.

SAMUEL S. GREENFIELD, OF FAIRPORT, NEW YORK.

FLUID TRANSMISSION MECHANISM.

1,297,347. Specification of Letters Patent. Patented Mar. 18, 1919.

Application filed July 29, 1918. Serial No. 247,324.

*To all whom it may concern:*

Be it known that I, SAMUEL S. GREENFIELD, a citizen of the United States, and resident of Fairport, in the county of Monroe and State of New York, have invented certain new and useful Impovements in Fluid Transmission Mechanisms, of which the following is a specification.

The present invention relates to fluid transmission mechanisms and more particularly to the type in which two fluid operating mechanisms are employed, one acting as the driving element and the other as the driven element, suitable provision being made whereby the driven element may be rotated in the same direction as the driving element, in a reverse direction, or held in a neutral position, while the driving element is in operation. An object of this invention is to provide a construction which will utilize as few parts as possible for effecting the results of mechanisms of this type, and which will also eliminate all sliding parts in the power portions of the mechanism. Another object of the invention is to provide a construction in which the element of friction will be reduced to a minimum. Still another object of the invention is to provide a common control for effecting a direct drive, a reverse drive, or a neutral position where the driving element does not move the driven element. A further object is to provide the driven element with a neutral circuit which may be controlled to produce a braking action. A still further object is to provide for obtaining variable speeds in the driven element by permitting part of the fluid on direct or reverse drive to pass through a neutral circuit.

To these and other ends, the invention consists of certain parts and combinations of parts all of which will be hereinafter described, the novel features being pointed out in the appended claims.

In the drawings:—

Figure 1 is a plan view, partly in section, of the transmission mechanism embodying the present invention, one of the casings being shown in section;

Fig. 2 is an interior view of the driving element, showing the valves adjusted to positions where the action of the driving element on the driven element is neutral;

Fig. 3 is a section on the line 3—3, Fig. 1;

Fig. 4 is a side view of the transmission mechanism;

Fig. 5 is a section on the line 5—5, Fig. 2; and

Fig. 6 is a detail view showing the valves adjusted to the position shown in Fig. 2, with the gearing wheels removed.

Referring more particularly to the drawings, 1 indicates the driving shaft which is driven by a suitable motor, and 2 the driven shaft, these shafts, in this instance, being in axial alinement and extending through the driving and driven elements A and B into a sleeve or tube 3 which connects the casings of the driving and driven elements. As the driving and driven elements are substantially the same except that the parts are reversed, the common parts will be described by like reference characters.

The driving and the driven elements each comprise a casing 4 having attaching lugs 5 projecting from opposite sides thereof, and a removable side wall 6. Within each casing a rotary piston 7 operates, this piston being of cylindrical form except for two radial, rigid, projecting blades 8, which are adapted to coöperate at their outer ends with the interior wall of the cylindrical part of the casing 4, the cylindrical portion of the piston being spaced from the casing so as to provide a fluid chamber. To one side of the cylindrical portion of the casing 4 an abutment chamber 9 is formed in which is arranged a rotary abutment 10, the main portion of which is of cylindrical form to coöperate with the cylindrical portion of the rotary piston 7, the abutment being provided with a recess or notch 11 adapted to receive the projecting blade 8 of the rotary piston 7. A block 10$^a$ is formed on the casing to close the recess so that fluid cannot pass from one side of the abutment to the other. The rotary abutment 10 does not rotate at the same axial speed as the rotary piston 7, but is driven at twice the axial speed of said piston, due to the fact that the circumference of the rotary piston is twice the circumference of the rotary abutment, thus making the peripheral speeds of the two parts the same. This relation is maintained by providing a gear wheel 12 on the rotary piston meshing with a gear wheel 13 on the rotary abutment.

To the end of connecting the casings of the driving and driven elements A and B for the purpose of providing a direct drive circuit to permit the driving element to drive the driven element in the same direction therewith, a passageway 14 is provided between the top of the abutment chamber 9 of the driving element A and the bottom of the abutment chamber 9 of the driving element B, and a passageway 15 is provided between the bottom of the abutment chamber 9 of the driving element A and the top of the abutment chamber 9 of the driving element B. By this arrangement fluid under pressure of the projecting blades 8 of the driving piston will pass from the casing of the driving element A through the passageway 14 above the abutment 10 of the driving element to the under side of the abutment 10 of the driven element, to act on the projecting blades 8 of the piston of the driven element, so as to drive the piston and the driven shaft 2 in the same direction as the driving shaft 1, the fluid being exhausted from the driven casing B by way of the passageway 15, returning to the casing of the driven element below the abutment 10 of said driving element. The control of this operation of the mechanism may be effected by a slide 16 formed with an opening 17 and arranged to open and close the passageways 14 and 15 adjacent the driving element, the slide in its lowermost position closing both of the passageways, and in its uppermost position bringing the opening 17 into register with the passageway 14 and uncovering the passageway 15 at its lower end.

The reverse operation of the driven element may be effected through a reverse drive circuit comprising preferably two passageways 18 and 19, the passageway 18 connecting the chamber 9 above the abutment 10 in the driving element with the chamber 9 above the abutment 10 in the driven element, and the passageway 19 connecting the chamber 9 below the abutment 10 in the driven element with the chamber 9 below the abutment 10 in the driving element. By this arrangement the fluid passes from the casing of the driving element through the passageway 18 into the casing of the driven element, acting on the blades 8 in the direction to rotate the driven piston 7 in the reverse direction, and exhausting by way of the passageway 19 to return the fluid to the casing of the driving element. The control of this circuit may be effected by a slide valve 20 having an opening 21 and adapted to control both the passageway 18 and the passageway 19. This slide valve is mounted on the casing of the driving element and when in its lowermost position closes both the passageway 18 and the passageway 19, while, in its uppermost position, it brings the opening 21 opposite the passageway 18 and uncovers at its lower end the passageway 19.

In order that the driving element and the driven element may be disconnected from each other, so that either may rotate without the other, two neutralizing circuits are formed preferably two passageways 22 and 23. The passageway 22 connects the upper part of the abutment chamber 9 of the driving element with the lower part of the abutment chamber 9 of said driving element, whereas the passageway 23 connects the upper part of the abutment chamber 9 of the driven element with the lower part of the abutment chamber 9 of said driven element. When these passageways are opened, either the driving piston or the driven piston may rotate independently of the other. The control of these passageways may be effected by two valves 24 and 25, the valve 24 controlling the passageway 22 and the valve 25 controlling the passageway 23. These valves are independently operable, the valve 25, in this instance, being operated through a bell crank lever 26 through an operating rod 26ª extending to any suitable point. It is apparent that when the valve 24 is opened the fluid will pass through the passageway 22 without communicating any motion to the driven piston. The valve 25 is provided in order to control the motion of the driven element. It is apparent that should the driving element be disconnected from the driven element, the driven element will continue to turn especially when connected to the wheels of the vehicle. This turning of the driven element may be stopped in time by operating the valve 25 which will therefore act as a brake for the vehicle. In other words, to brake and stop the vehicle, all that is necessary is to shift the valves so that the driving element does not act on the driven element, and then the valve 25 is shifted to brake and stop the action of the driven element.

It is preferred to employ a common control for the valves 16, 20 and 24, and to this end two bell crank levers 27 and 28 may be provided, these levers being oppositely arranged and engaging, respectively, projections 29 and 30 on a slide 31 which is suitably guided in ways 32 in the casing 33 supported on the driving casing A. Connection between these levers 27 and 28 is established, respectively, with the valves 16 and 20 by pins and slots, as shown in Fig. 6, while connection with the valve 24 is established by providing the bell crank levers 27 and 28, respectively, with arms 34 and 35 bearing upon a pin 36 formed on the valve 24. A spring 37 anchored in the casing 33 connects with the valve 24, so as normally to act on the valve in a direction to hold the valve 24 open and through a pin 36 to hold the valves 16 and 20 closed in the manner shown in Fig. 6 in the drawings. Should the slide 31 be moved to the right, the valve 16 will be opened while the valve 24 will be closed. This will effect the driving of the driven element in the same direction as that of the driving element. By partially opening the valve 16 and partially closing the valve 24, the speed of the driven element may be controlled in a forward direction. When the slide 31 is moved toward the left, the valve 20 will be opened and the valve 24 will be closed. This will effect the reverse movement of the driven element, and the speed of such reverse movement may be controlled by varying the amount of opening of the valves 20 and 24.

From the foregoing it will be seen that there has been provided a transmission mechanism in which all sliding abutments are eliminated, the pistons, as well as their coöperating abutments being rotary. This construction reduces the number of parts to a minimum and eliminates the friction present in constructions having sliding abutments. A controlling mechanism is provided by which the speed for direct drive or reverse drive may be readily controlled, and when the driving element is disconnected from the driven element the latter may be controlled in such a manner that gradual braking of the vehicle may be secured. A common control is provided to obtain direct drive, reverse drive, or a neutral position. It is apparent that the driven element acts as a motor while the driving element acts as a pump and that certain features of this invention are capable of being embodied in such devices.

What I claim as my invention and desire to secure by Letters Patent is:—

1. A fluid transmission mechanism comprising two separated casings, a fluid driving element arranged in one casing, a fluid driven element arranged in the other casing, two connections between the casings providing a direct driving fluid circuit, two connections between the casings providing a reverse driving fluid circuit, a by-pass for each casing providing two neutralizing fluid circuits, one for the driving element and one for the driven element, valves for controlling the two connections forming the direct driving circuit, valves for controlling the two connections from the reversed driving circuit, and valves for controlling the two neutralizing circuits.

2. A fluid transmission mechanism comprising two separated casings, a fluid driving element arranged in one casing, a fluid driven element arranged in the other casing, two connections between the casings providing a direct driving fluid circuit, two connections between the casings providing a reverse-driving fluid-circuit, a by-pass for each casing providing two neutralizing fluid-circuits, one for the driving element and one for the driven element, valves for controlling the two connections forming the direct-driving circuit, valves for controlling the two connections forming the reverse-driving circuit, and valves for controlling the two neutralizing circuits, the valve for the neutralizing circuit of the driving element being opened with the closing of either the valves for the direct-driving fluid-circuit or the valves for the reverse-driving fluid-circuit and being closed either with the opening of the direct-driving fluid circuit valves or the opening of the reverse-driving fluid-circuit valves.

3. A fluid transmission mechanism comprising two separated casings, a fluid driving element arranged in one casing, a fluid driven element arranged in the other casing, two connections between the casings providing a direct driving fluid circuit, two connections between the casings providing a reverse driving fluid circuit, a by-pass for each casing providing two neutralizing fluid circuits, one for the driving element and one for the driven element, valves for controlling the two connections forming the direct driving circuit, valves for controlling the two connections forming the reverse driving circuit, valves for controlling the two neutralizing circuits, common controlling means for the valves of the direct drive fluid circuit, the reverse drive fluid circuit and the neutralizing fluid circuit for the driving element, and an independently controllable valve for controlling the neutralizing fluid circuit of the driven element.

4. A fluid transmission mechanism comprising a fluid driving element, a fluid driven element, a direct drive fluid circuit between the elements, a reverse driving fluid circuit between the elements, a neutralizing fluid circuit for the driving element, a valve for said circuit, a spring acting on the valve controlling said neutralizing circuit, two bell-crank levers, each connected to the valve of one of the other circuits and to the valve of the neutralizing circuit, and a common controlling member connecting with the bell-crank levers and adapted, when moved in one direction, to open one of the last two named valves and to close the valve controlling the neutralizing circuit, and when moved in the other direction, to open the other of said valves and to close the valve controlling the neutralizing circuit.

5. A fluid transmission mechanism comprising a fluid driving element, a fluid driven element, a direct drive fluid circuit between the elements, a reverse drive fluid circuit between the elements, a neutralizing fluid circuit for the driving element, a neutralizing fluid circuit for the driven element, common means for controlling the direct drive circuit, the reverse drive circuit, and the neutralizing circuit of the driving element, and an independent control for the neutralizing circuit of the driven element to permit the braking of said driven element independently of the fluid driving element.

6. A fluid transmission mechanism comprising a fluid driving element, a fluid driven element, a direct drive fluid circuit between the elements, a reverse drive fluid circuit between the elements, a neutralizing fluid circuit for the driving element, a neutralizing fluid circuit for the driven element, separate valves for the different circuits, common means for closing the valve of the neutralizing circuit for the driving element with the opening of either the direct or the reverse drive circuit, and independently controllable means for the valve of the neutralizing circuit of the driven member.

7. A fluid transmission mechanism comprising a fluid driving element, a fluid driven element, a direct drive circuit between the elements, a neutralizing circuit for the driving element, valves for controlling said circuits, a spring acting on the valve controlling the neutralizing circuit to maintain said valve open, a bell crank lever connected to the valve controlling the direct driving circuit and also connected to the valve controlling the neutralizing circuit, and a controlling member connected to said bell crank lever.

8. A fluid transmission mechanism comprising a fluid driving element, a fluid driven element, a direct drive circuit between the elements, a reverse drive circuit between the elements, a neutralizing circuit for the driving element, a neutralizing circuit for the driven element, and valves for controlling said circuits.

9. A fluid transmission mechanism according to claim 8, in which the valve for the neutralizing circuit of the driven element is controllable independently of the neutralizing valves for the driving element in order that said valve may be utilized to brake the movement of the driven element.

10. A fluid transmission mechanism comprising a fluid-driving element, a fluid-driven element, a direct driving circuit between the elements, a reverse-driving circuit between the elements, a neutralizing-circuit for the driving element, a neutralizing-circuit for the driven element, a valve for controlling the neutralizing circuit of the driving element, a valve for controlling the neutralizing circuit for the driven element, operable independently of the valve for controlling the neutralizing circuit of the driving element, and means for simultaneously holding the direct-driving circuit and the reverse-driving circuit closed.

SAMUEL S. GREENFIELD.